Aug. 19, 1941.　　　G. WITTLIEF　　　2,252,908
MOUSETRAP
Filed April 7, 1941　　　2 Sheets-Sheet 1

Inventor
GEORGE WITTLIEF

By Clarence A. O'Brien

Attorney

Aug. 19, 1941.   G. WITTLIEF   2,252,908
MOUSETRAP
Filed April 7, 1941   2 Sheets-Sheet 2
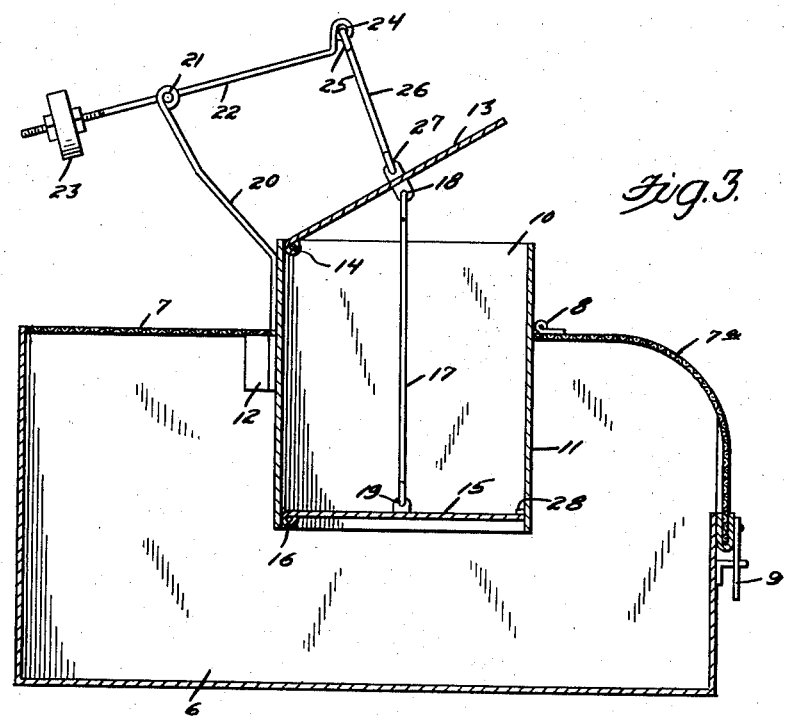
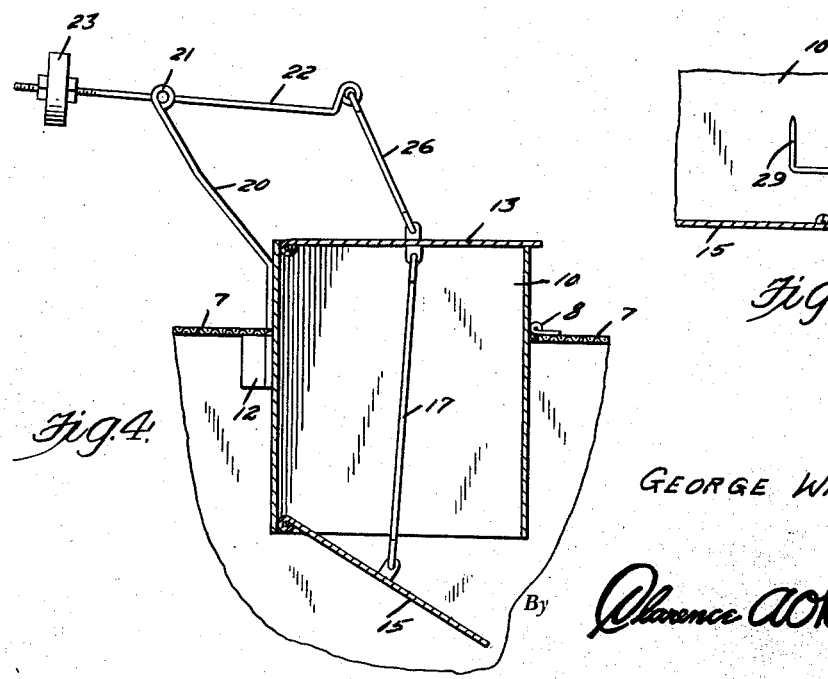
Inventor
GEORGE WITTLIEF
By Clarence A. O'Brien
Attorney Patented Aug. 19, 1941

2,252,908

UNITED STATES PATENT OFFICE 2,252,908

MOUSETRAP

George Wittlief, Douglas, Minn.

Application April 7, 1941, Serial No. 387,325

2 Claims. (Cl. 43—69)

This invention relates to traps and while the same is especially designed for catching mice, in actual practice the trap may be used to advantage for catching rats or other rodents.

An object of the invention is to simplify materially traps of this character, and at the same time provide a trap whereby the victim, without being removed from the trap, can be drowned so that the extermination of the rodent can be accomplished in a most humane manner.

The invention, together with its objects and advantages, will be best understood from a study of the following description taken in connection with the accompanying drawings wherein:

Figure 3 is a transverse sectional view taken substantially on the line 3—3 of Figure 1.

Figure 4 is an enlarged detail fragmentary sectional view showing the lower door in open position and the upper door or closure in closed position, and Figure 5 is a fragmentary detail sectional view taken substantially on the line 5—5 of Figure 1.

Figure 1:
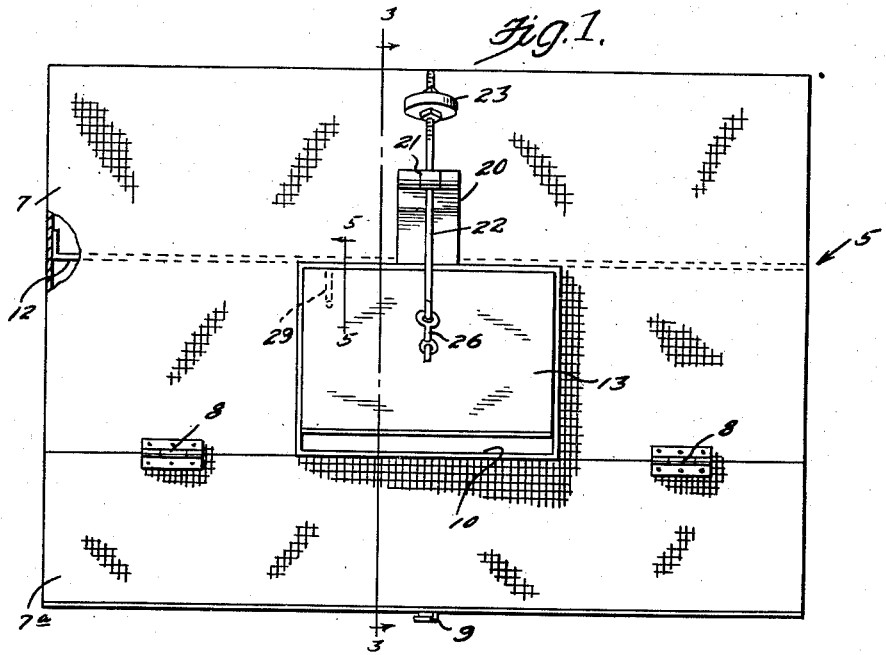
Figure 1 is a top plan view of the trap embodying the features of the present invention.
Figure 2:
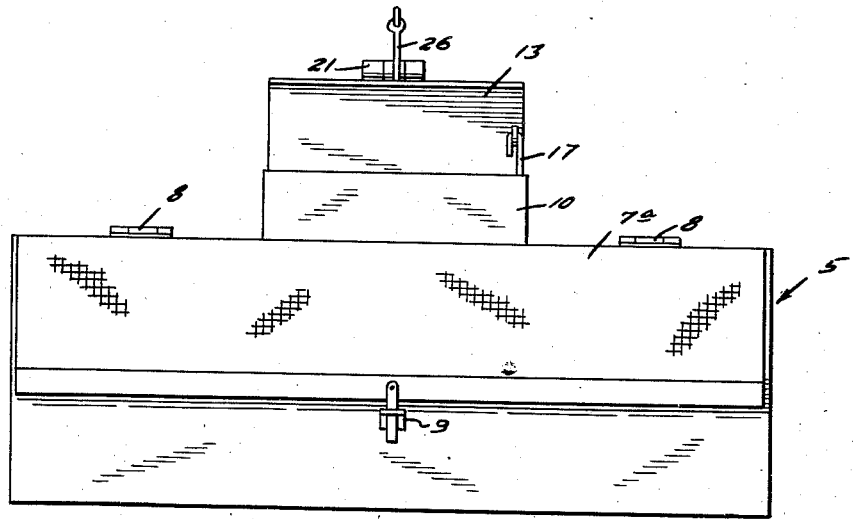
Figure 2 is a front elevational view thereof.

Referring more in detail to the drawings it will be seen that in the preferred embodiment thereof the body 5 of the trap is somewhat rectangular in shape and presents a relatively large compartment therein serving as a retaining pen 6. A portion of the top of the compartment is enclosed by screening or wire netting 7, while the remaining portion of the top and a portion of the front of the pen are enclosed by a screen or wire netting 7a that serves as a lid or door for the pen 6 and is hinged to an edge of the screening or wire netting 7 as at 8.

Suitable fastener means 9 is provided for the door 7a.

For the pen 6 there is provided an entrance through the top of the pen, and this entrance, indicated generally by the reference numeral 10, is formed through the medium of a tubular member 11 that extends vertically through an opening in the top portion 7 and is, at one side, welded or otherwise secured to a bar 12 that extends between opposite end walls of the pen and also serves to support and reinforce the top wall portion 7 of the pen.

For the entrance tunnel 10 there is provided an outer trap door 13 hinged to one side of the tunnel as at 14 and opening outwardly of the tunnel, and a trap door 15 at the inner end of the tunnel 10 and hinged to one side of the tunnel as at 16 to open inwardly of the pen 6.

The trap doors 13 and 15 are connected together through the medium of a link 17 that is pivoted at one end thereof to the door 13 as at 18, and at an opposite end thereof is pivoted to the door 15 as at 19.

Secured to and extending away from the upper end of the tunnel 10 at one side thereof is a bracket 20 on the free end of which is pivoted as at 21 a lever 22.

On one end thereof the lever 22 has adjustably secured a weight 23, while the opposite end of the lever is provided with an eye 24 with which is engaged an eye 25 on one end of a link 26.

The link 26 has an end thereof pivoted to the trap door 13 as at 27.

From the foregoing it will be seen that in response to the weight 23 on the lever 22, trap door 13 will normally be swung upwardly to an open position, while trap door 15 is normally swung upwardly to a closed position. In this connection it will be noted that a suitable stop 28 is provided interiorly of the entrance tunnel 10 and against which the door 15 abuts when in fully closed position.

Also suitably mounted within the entrance tunnel 10 is a hook 29 upon which suitable bait is impinged.

The operation of the device will be readily understood and is as follows: Trap door 13 is normally held open in response to the action of weight 23, while trap door 15 is normally held closed. It will thus be seen that the animal, attracted by the bait in the entrance tunnel 10, may readily pass into the tunnel. When the weight of the animal bears on the trap door 15, the latter will tilt down, thus precipitating the animal within the pen compartment 6. After the weight of the animal is relieved from the trap door 15, the weight 23 on the lever 22 will return the trap doors 15 and 13 to their normal position which is the position best shown in Figure 3.

It will thus be seen that the trap will catch and retain mice and other rodents to the capacity of the pen compartment.

The mice, or other rodents entrapped may be readily drowned by placing the entire trap into a pan of water.

With door 7a open, access may be readily had to the pen 6 for removing the rodents therefrom.

It is to be understood that I do not desire to be limited to the exact details of construction shown and described, for obvious modifications will occur to a person skilled in the art.

Having thus described the invention what is claimed as new is:—

1. In a trap, a pen compartment, a door hinged to the trap for gaining access to the pen compartment, a top wall of said trap and said door respectively being formed of wire netting, a vertical entrance tunnel for the pen compartment embodying a substantially tubular member extending vertically through the top wall of the trap, trap doors hinged to one side of the tunnel adjacent the respective opposite ends of the tunnel, the trap door at the outer end of the tunnel opening outwardly with respect to the tunnel and the trap door at the inner end of the tunnel opening inwardly of the pen compartment, a link pivotally connecting said trap doors, a bracket extending outwardly from the entrance tunnel adjacent the outer end of the latter, a counterbalancing weight assembly pivotally mounted on said bracket, and a link pivotally connecting said assembly with the first-named trap door.

2. A trap embodying a pen compartment and a tubular formation forming an entrance tunnel for said pen compartment, said tunnel being disposed vertically with respect to the compartment and opening into the compartment through the top of the trap, trap doors hinged to one side of the entrance tunnel at opposite ends of said tunnel, an operating connection between said doors for transmitting movement of one door to the other, and a counter-balancing weight means operatively connected to one of the trap doors for normally holding the trap door at the outer end of the entrance tunnel open and the trap door at the inner end of the entrance tunnel closed.

GEORGE WITTLIEF.